United States Patent
Lin

(10) Patent No.: US 10,515,022 B2
(45) Date of Patent: Dec. 24, 2019

(54) DATA CENTER WITH DATA ENCRYPTION AND METHOD FOR OPERATING DATA CENTER

(71) Applicant: Silicon Motion, Inc., Jhubei, Hsinchu County (TW)

(72) Inventor: Ting-Kuan Lin, Hemei Township, Changhua County (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 251 days.

(21) Appl. No.: 15/858,087

(22) Filed: Dec. 29, 2017

(65) Prior Publication Data
US 2018/0322068 A1 Nov. 8, 2018

(30) Foreign Application Priority Data
May 4, 2017 (TW) .............................. 106114776 A

(51) Int. Cl.
G06F 12/14 (2006.01)
G06F 21/10 (2013.01)
G06F 21/62 (2013.01)
G06F 21/31 (2013.01)
H04L 9/08 (2006.01)

(52) U.S. Cl.
CPC .......... G06F 12/1408 (2013.01); G06F 21/10 (2013.01); G06F 21/31 (2013.01); G06F 21/6218 (2013.01); H04L 9/0897 (2013.01)

(58) Field of Classification Search
CPC ....... G06F 12/1408; G06F 21/10; G06F 21/31
See application file for complete search history.

(56) References Cited

U.S. PATENT DOCUMENTS

| 8,611,543 | B2* | 12/2013 | Falk | H04L 63/06 380/279 |
| 9,619,148 | B2* | 4/2017 | Bowman | G06F 3/061 |
| 2008/0222734 | A1* | 9/2008 | Redlich | G06F 21/577 726/26 |
| 2012/0079289 | A1* | 3/2012 | Weng | G06F 21/79 713/193 |
| 2013/0212671 | A1* | 8/2013 | Wang | G06F 21/70 726/16 |

(Continued)

FOREIGN PATENT DOCUMENTS

| TW | I536199 B | 6/2016 |
| TW | 201715431 A | 5/2017 |
| TW | I581125 B | 5/2017 |

*Primary Examiner* — Ali Shayanfar
(74) *Attorney, Agent, or Firm* — McClure, Qualey & Rodack, LLP

(57) ABSTRACT

A high-security data center, having at least one data storage device, a host and an encryption and decryption key space. Each data storage device has a non-volatile memory and a controller chip. The controller chip includes an encryption and decryption module. The host machine operates the non-volatile memory via the controller chip. The encryption and decryption key space stores a key for the encryption and decryption module to perform data encryption and decryption. The encryption and decryption key space is isolated from the data storage device and the host machine by default so that a user who does not pass identity authentication is unable to operate the encryption and decryption module through the host to decrypt data of the non-volatile memory.

18 Claims, 5 Drawing Sheets

(56) References Cited

U.S. PATENT DOCUMENTS

| | | | |
|---|---|---|---|
| 2014/0330869 A1* | 11/2014 | Factor | G06F 21/6218 |
| | | | 707/783 |
| 2014/0330936 A1* | 11/2014 | Factor | H04L 63/0281 |
| | | | 709/219 |
| 2015/0082399 A1* | 3/2015 | Wu | G06F 21/6209 |
| | | | 726/6 |
| 2015/0095661 A1* | 4/2015 | Sell | G06F 12/1408 |
| | | | 713/193 |
| 2015/0261693 A1* | 9/2015 | Craddock | G06F 12/1475 |
| | | | 711/113 |
| 2016/0330180 A1* | 11/2016 | Egorov | G06F 21/6227 |
| 2017/0155628 A1* | 6/2017 | Rohloff | H04L 9/30 |
| 2017/0285982 A1* | 10/2017 | DeArment | G06F 9/44505 |
| 2019/0036701 A1* | 1/2019 | Solhjell | H04L 9/0894 |

* cited by examiner

DATA CENTER WITH DATA ENCRYPTION AND METHOD FOR OPERATING DATA CENTER

CROSS REFERENCE TO RELATED APPLICATIONS

This Application claims priority of Taiwan Patent Application No. 106114776, filed on May 4, 2017, the entirety of which is incorporated by reference herein.

BACKGROUND OF THE INVENTION

Field of the Invention

The present invention relates to data security in a data center.

Description of the Related Art

In addition to traditional hard disks (HD), there are new non-volatile memories used for long-term data storage, such as flash memory, magnetoresistive RAM, ferroelectric RAM, resistive RAM, spin transfer torque-RAM (STT-RAM), and so on. Such a novel form of non-volatile memory is typically combined with a controller chip to form a data storage device and may be used in a data center to replace the traditional hard disks. Data security in a data center is an important issue in this area of technology.

BRIEF SUMMARY OF THE INVENTION

A new architecture for a data center is disclosed in the disclosure. A key for data encryption and decryption is protected within an encryption and decryption key space. A hacker is prevented from finding the key according to a log file and fails to decrypt the encrypted data.

A data center in accordance with an exemplary embodiment of the disclosure comprises at least one data storage device, a host, and an encryption and decryption key space. Each data storage device has a non-volatile memory and a controller chip, and the controller chip has an encryption and decryption module. The host operates the non-volatile memory via the controller chip. The encryption and decryption key space stores a key for the encryption and decryption module to perform data encryption and decryption. Specifically, the encryption and decryption key is isolated from the data storage device and the host by default so that a user who does not pass identity authentication is unable to operate the encryption and decryption module through the host to decrypt data of the non-volatile memory.

A method for operating a data center comprises the following steps: providing at least one data storage device in the data center, wherein each data storage device has a non-volatile memory and a controller chip, and each controller chip has an encryption and decryption module; using a host of the data center to operate the non-volatile memory via the controller chip; and providing an encryption and decryption key space storing a key for the encryption and decryption module to perform data encryption and decryption. The encryption and decryption key space is isolated from the data storage device and the host by default so that a user who does not pass identity authentication is unable to operate the encryption and decryption module through the host to decrypt data of the non-volatile memory.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

There are various forms of non-volatile memory for long-term data retention, such as a flash memory, a magnetoresistive RAM, a ferroelectric RAM, a resistive RAM, a spin transfer torque-RAM (STT-RAM) and so on. Such a novel non-volatile memory is typically combined with a controller chip to form a data storage device, and may be used in a data center to replace the traditional hard disk drives (HDDs).

The following discussion uses solid state drives (SSDs) in particular as an example, but it is not intended to be limited thereto. Flash memory is used in an SSD as the storage medium. The SSDs may replace the HDDs in a data center.

Figure 1:
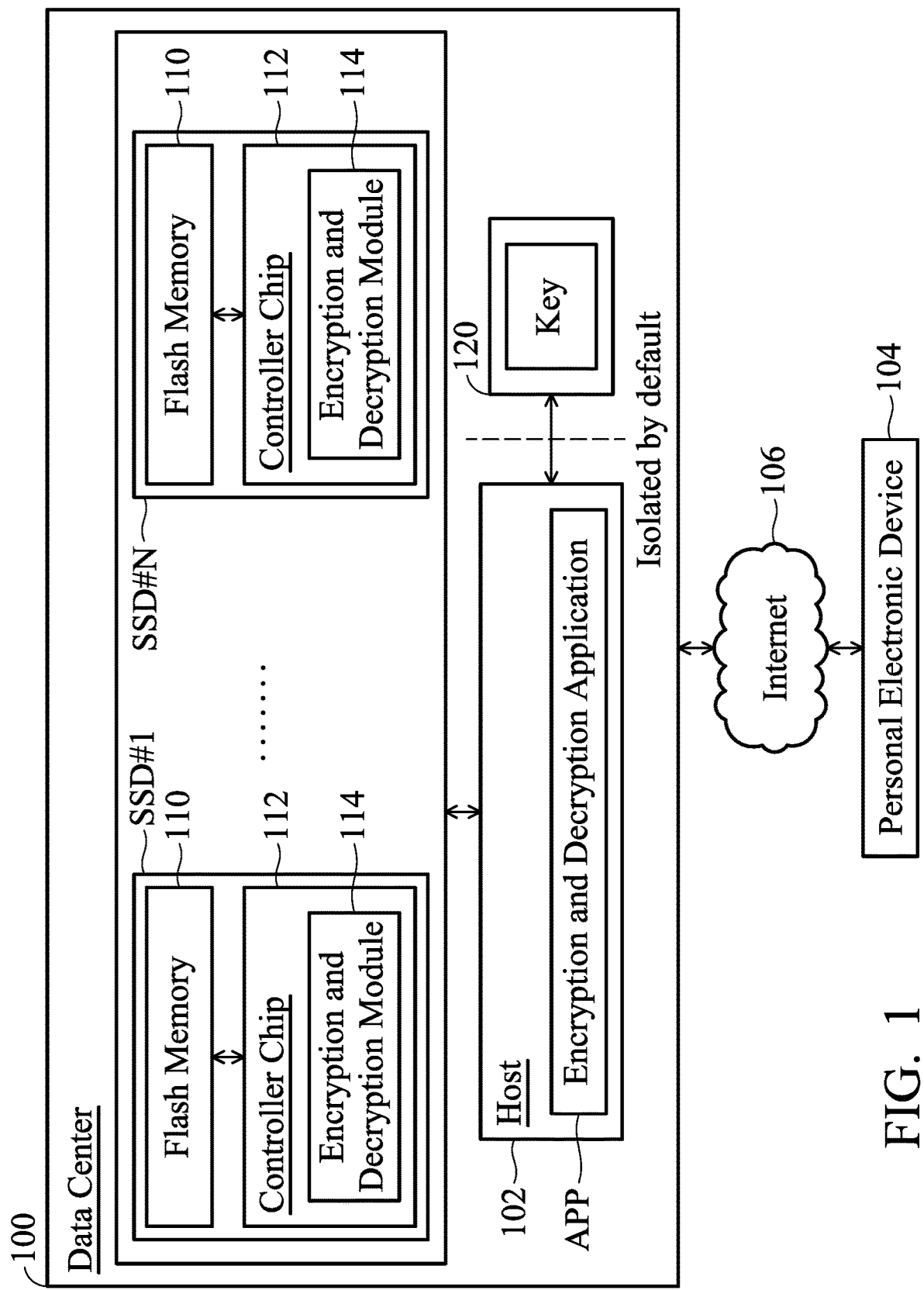
FIG. 1 depicts a data center 100 in accordance with an exemplary embodiment of the disclosure.

FIG. 1 depicts a data center 100 in accordance with an exemplary embodiment of the disclosure. The data center 100 comprises solid state drives SSD#1 . . . SSD#N and a host 102. The user may operate a personal electronic device 104 to connect to the data center 100 through internet 106. The host 102 stores the data uploaded from the user to the solid state disks SSD#1 . . . SSD#N.

As shown, each of the solid state drives SSD#1 . . . SSD#N has a flash memory 110 and a controller chip 112. The controller chip 112 includes an encryption and decryption module 114. The encryption and decryption module 114 encrypts and decrypts data according to ASE (Advanced Encryption Standard) to provide encrypted data to be stored in the flash memory 110 and to decrypt the data retrieved from the flash memory 110. In an exemplary embodiment, the encryption and decryption module 114 is provided in the controller chip 112 by a hardware and software combination design. The host 102 that operates the solid state drives SSD#1 . . . SSD#N may run an encryption and decryption application APP. The encryption and decryption module 114 is driven by vendor unique commands called in the encryption and decryption application APP or is enabled when correct user password is entered. Because the encryption and decryption module 114 is provided by the controller chip 112 of the SSD side, the host 102 is protected from being overused in data encryption and decryption. As for the security issues of the encryption and decryption module 114, a security mechanism for the key required in data encryption and decryption is proposed in the disclosure as well as the aforementioned vendor unique commands specifically used in driving the encryption and decryption module 114.

For a user who connects to the data center 100 through the network 106 via the personal electronic device 104, the host 102 may determine whether the uploaded data is confidential data (e.g., an identity card number, a permanent address, etc.). The types of confidential data may be defined at the host 102 side. When confidential data is uploaded, the running encryption and decryption application APP uses vendor unique commands to drive the encryption and decryption module 114 at the SSD side. In the disclosure, the firmware of device is specifically designed to allocate particular LBAs (logical block addresses) in response to the vendor unique commands to manage the confidential data. A safe box for confidential data, therefore, is provided. To improve data security, the key for the safe box (i.e. the key for data encryption and decryption) is protected in another place. The encryption and decryption application APP may prompt the user to enter the key. In another exemplary embodiment, the key is generated by the encryption and decryption application APP. The entered or generated key is passed to the encryption and decryption module 114 to encrypt and store the confidential data to the flash memory 110. In particular, after being used in the encryption and decryption module 114, the key is not retained in the solid state drives SSD#1 . . . SSD#N neither the host 102. The encryption and decryption application APP may store the key in an encryption and decryption key space 120 that is provided outside the solid state drives SSD#1 . . . SSD#N and the host 102. After storing the key, the encryption and decryption key space 120 is further disconnected from the host 102. If the host 102 receives a read request for the confidential data later (e.g. reading data of the particular logical block address), the encryption and decryption application APP calls for identity authentication of the user. When the identity authentication succeeds, the host 102 reconnects to the encryption and decryption key space 120 to fetch the key from the encryption and decryption key space 120 by executing the encryption and decryption application APP. The fetched key is passed to the encryption and decryption module 114 of the controller chip 112 to decrypt the confidential data read from the flash memory 110. After the data decryption, the encryption and decryption application APP runs to remove the key from the solid-state hard drives SSD#1 . . . SSD#N and the host 102, and breaks the connection between the host 102 and the encryption and decryption key space 120 again. Because of the host 102 and the encryption and decryption key space 120 are isolated from each other in default, the confidential data stored in the solid state drives SSD#1 . . . SSD#N is safely protected from hackers or inner thieves who try to steal the confidential data through the host 102. Without the key, the confidential data is securely protected in the stolen solid state drives SSD#1 . . . SSD#N as meaningless garbled code.

In an exemplary embodiment, the encryption and decryption key space 120 is provided in a plug-in storage device, such as a USB storage device. The plug-in storage device is typically kept by a staff of the data center 100. The staff only inserts the plug-in storage device to the host 102 for the users who have been authenticated.

In an exemplary embodiment, the encryption and decryption key space 120 is provided in a key server. The key server stores several keys, corresponding to different LBA sectors. The different LBA sectors may be assigned to different users with dedicated access privileges. The connection between the host 102 and the key server is established according to identity authentication. The key server only provides the corresponding key for the user who passes the identity authentication.

In an exemplary embodiment, when read request for reading a particular LBA is received, the encryption and decryption application APP runs and thereby the remote personal electronic device 104 presents a prompt message to direct the remote user to contact the data center 100 for identity authentication. In another exemplary embodiment, the encryption and decryption application APP runs to identify the remote user by a login password or by fingerprint or face recognition.

In an exemplary embodiment, the encryption and decryption application APP further allows legal users to manage the confidential data in the data center 100. For example, the controller chip 112 may be operated according to the encryption and decryption application APP to delete the confidential data at a particular LBA by erasing the physical blocks allocated to the particular LBA. The released physical blocks, thereby, become spare blocks waiting to be allocated to store other data.

Figure 2:
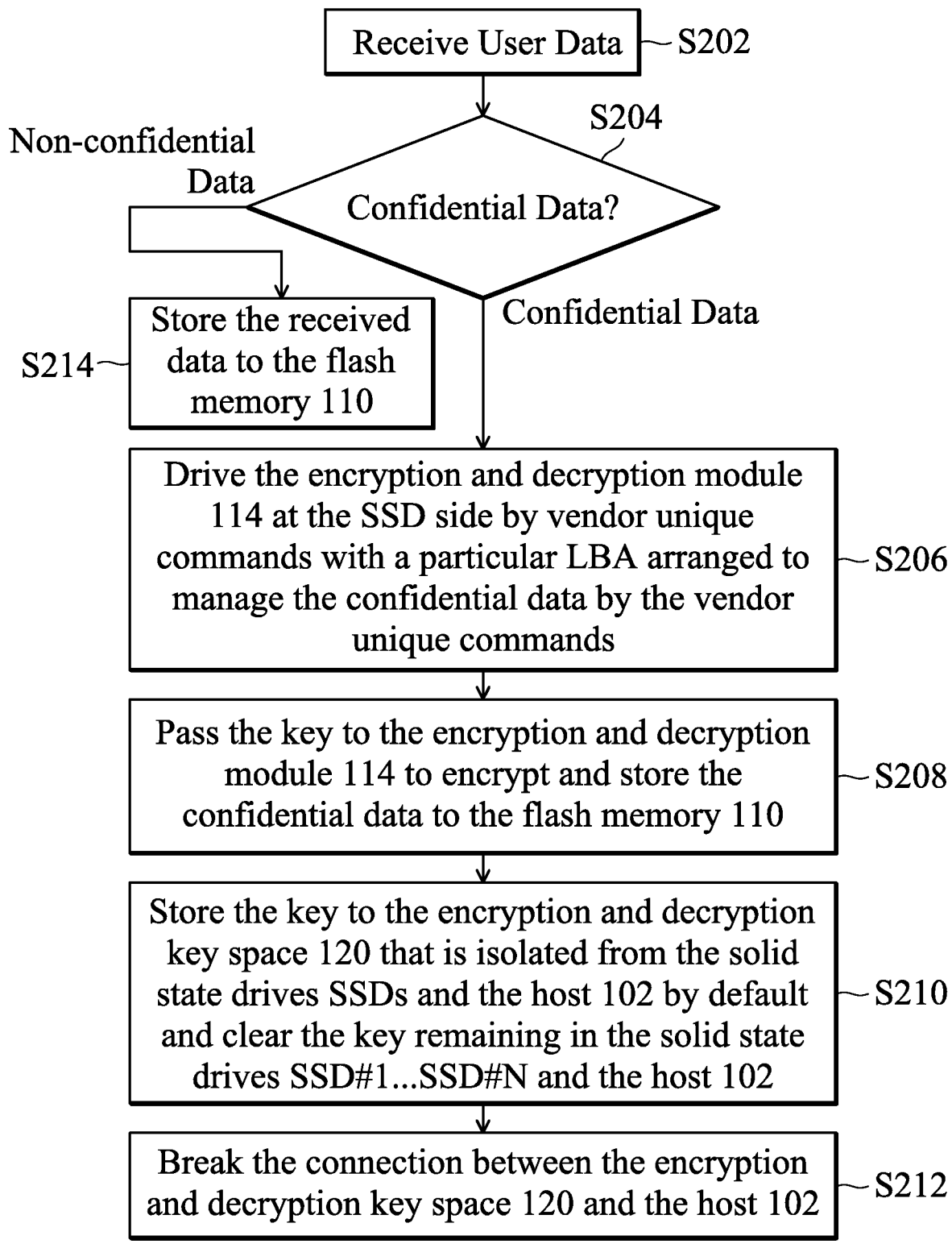
FIG. 2 is a flowchart depicting how the data center 100 processes the data uploaded from the user in accordance with an exemplary embodiment of the disclosure.

FIG. 2 is a flowchart depicting how the data center 100 processes the data uploaded from the user in accordance with an exemplary embodiment of the disclosure. User data is received in step S202 and confidential data is identified in step S204. Step S206 is performed for confidential data to drive the encryption and decryption module 114 at the SSD side by vendor unique commands and a particular LBA is arranged to manage the confidential data by the vendor unique commands. In step S208, the key is passed to the encryption and decryption module 114 to encrypt and store the confidential data to the flash memory 110. In step S210, the key is stored back to the encryption and decryption key space 120 rather than being maintained in the solid state drives SSD#1 . . . SSD#N and the host 102. In step S212, the connection between the encryption and decryption key space 120 and the host 102 is broken. According to steps S206 to S212, a safe box for the confidential data is provided while the key for the safe box is hidden in another place. When it is determined in step S204 that no confidential data is received, steps S206 to S212 are bypassed and step S214 is performed to store the received data in the flash memory 110 without data encryption.

Figure 3:
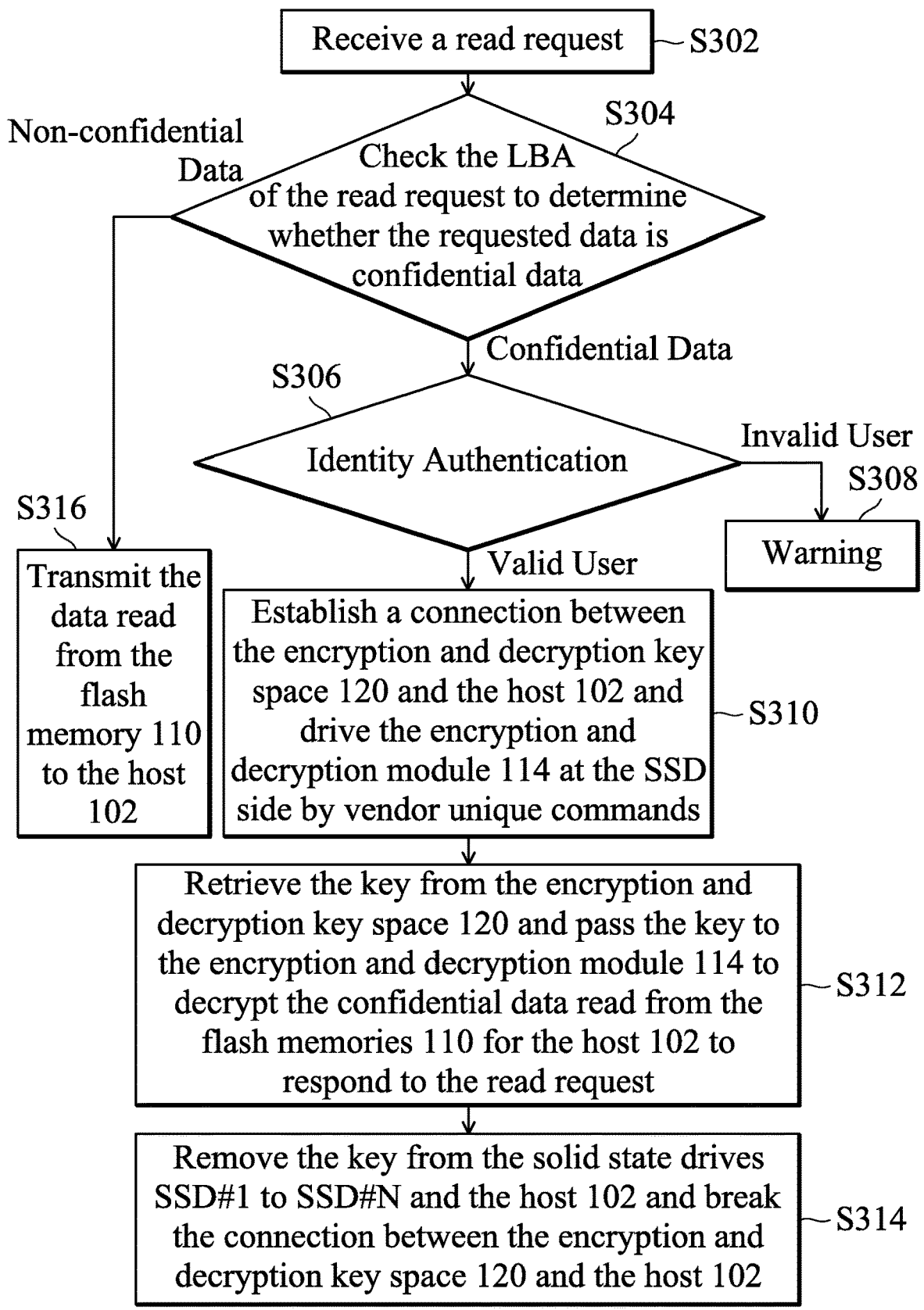
FIG. 3 is a flowchart depicting how the data center 100 answers a read request.

FIG. 3 is a flowchart depicting how the data center 100 answers a read request. A read request is received in step S302. In step S304, the LBA of the read request is checked to determine whether the requested data is confidential data. When the requested LBA is the particular LBA arranged for confidential data, the requested data is confidential data. Identity authentication of the user is performed in step S306. When the user is not allowed to read the confidential data, a warning is shown by step S308. When the identity authentication succeeds, in step S310, a connection between the encryption and decryption key space 120 and the host 102 is established and the encryption and decryption module 114 at the SSD side is driven by vendor unique commands. In step S312, the key is retrieved from the encryption and decryption key space 120 and passed to the encryption and decryption module 114 to decrypt the confidential data read from the flash memories 110 for the host 102 to respond to the read request. In step S314, the key is removed from the solid state drives SSD#1 to SSD#N and the host 102 and the connection between the encryption and decryption key space 120 and the host 102 is broken again. As for a read request for non-confidential data, step S316 is performed. The controller chip 112 transmits the data read from the flash memory 110 to the host 102 without operating the encryption and decryption module 114.

Figure 4:
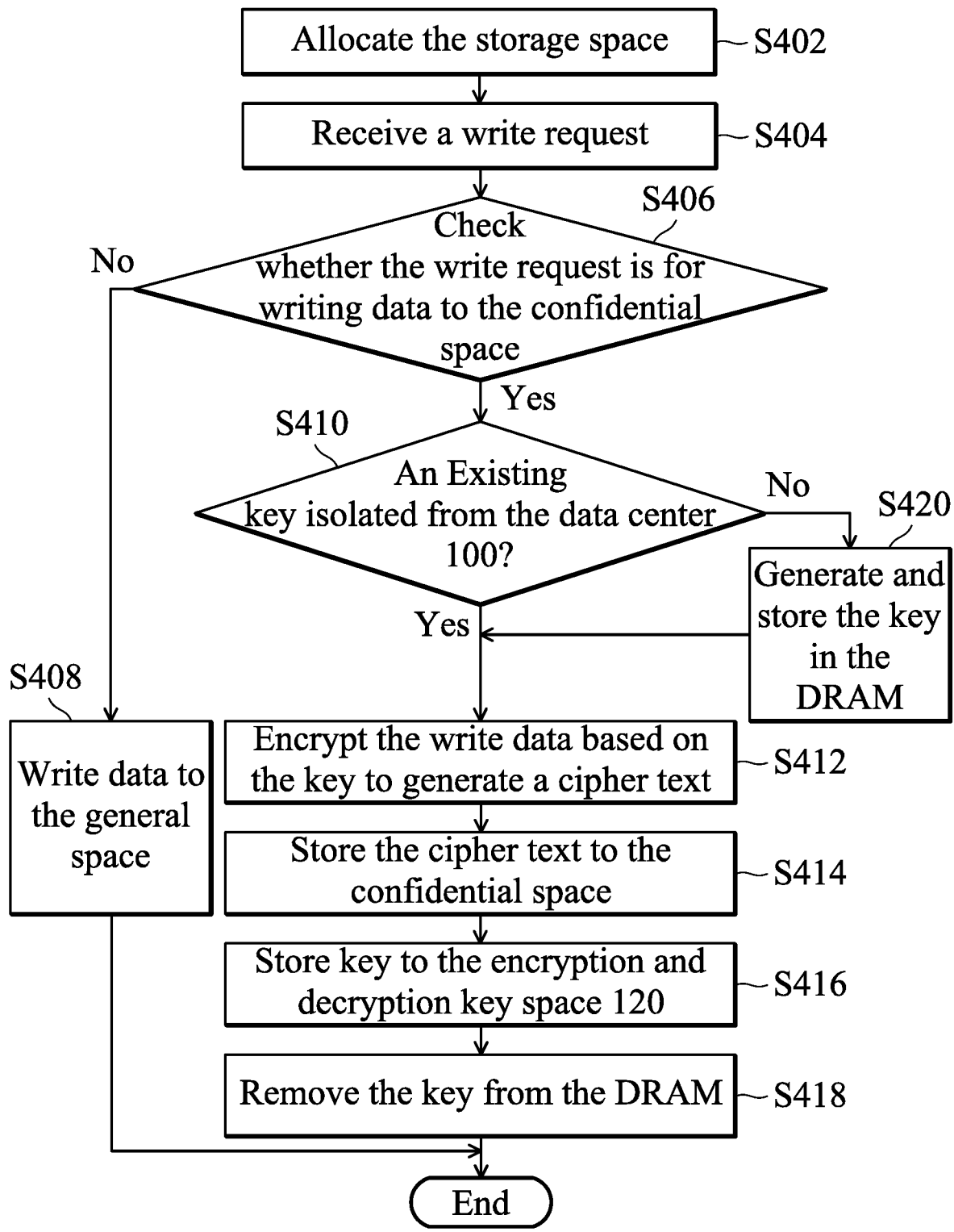
FIG. 4 is a flowchart depicting how the data center 100 processes the data uploaded from a user in accordance with another exemplary embodiment of the disclosure.

FIG. 4 is a flowchart depicting how the data center 100 processes the data uploaded from a user in accordance with another exemplary embodiment of the disclosure. In step S402, a data center 100 is allocated to provide a general space and a confidential space in separated namespaces or separated directories. In step S404, a write request from the host 102 is received. In step S406, it is checked whether the write request is for writing data to the confidential space. If not, step S408 is performed to write data to the general space. If yes, step S410 is performed to determine whether a key isolated from the data center 100 exists. For example, the key may be protected in a key server or in a plug-in device as the aforementioned encryption and decryption key space 120. If no key exists, step S420 is performed to generate and store the key in the DRAM. When the key is available, step S412 is performed to encrypt the write data based on the key to generate a cipher text. In step S414, the cipher text is stored to the confidential space. In step S416, the key is stored back to the encryption and decryption key space 120. In step S418, the key is removed from the DRAM and the flow ends. Note that in the data center 100, the key is temporarily stored in the DRAM rather than being permanently preserved. Thus, a malicious hacker reading the data center 100 is prevented from acquiring the key. The confidentiality of the data center 100 is enhanced. Note that step S416 may be omitted when step S410 determines that the key is already kept in an isolated space.

Figure 5:
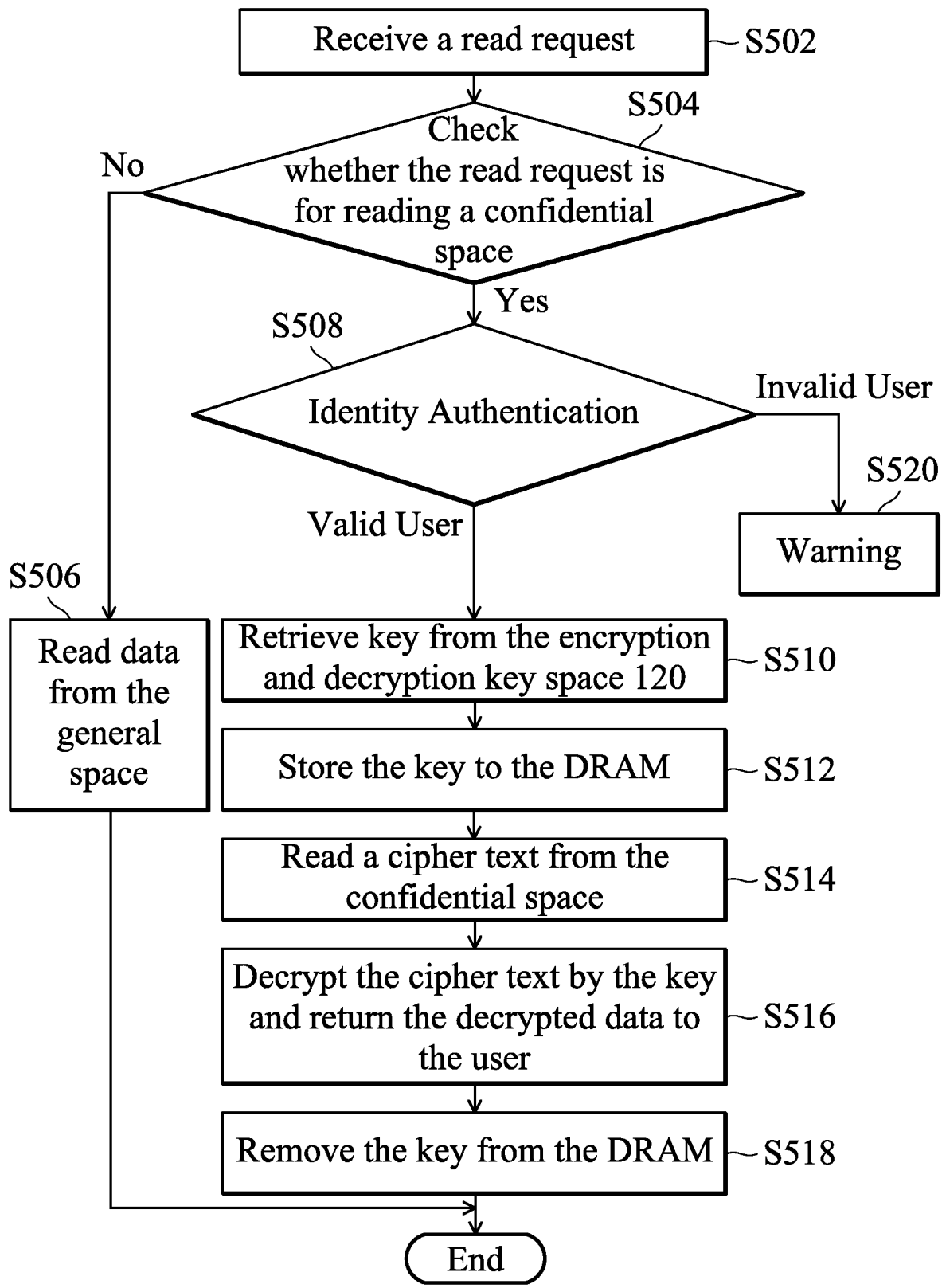
FIG. 5 is a flowchart depicting how the data center 100 answers a read request in accordance with another exemplary embodiment of the disclosure.

FIG. 5 is a flowchart depicting how the data center 100 answers a read request in accordance with another exemplary embodiment of the disclosure. In step S502, a read request is received. In step S504, it is checked whether the read request is for reading a confidential space. If not, step S506 is performed and data is read from a general space to answer the read request. If yes, step S508 is performed for identity authentication of the user. When the identity authentication fails, a warning is shown by step S520. When the identity authentication succeeds, the key is retrieved in step S510 from the generally-isolated space and is stored in the DRAM by step S512. In step S514, a cipher text is read from the confidential space. In step S516, the cipher text is decrypted by the key and decrypted data is returned to the user. In step S518, the key is removed from the DRAM and the flow ends. Note that in the data center 100, the key is temporarily stored in the DRAM rather than being permanently preserved. Thus, a malicious hacker reading the data center 100 is prevented from acquiring the key. The confidentiality of the data center 100 is enhanced.

Other techniques that use the aforementioned concepts to protect the encryption and decryption key are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data center, comprising:
   at least one data storage device each having a non-volatile memory and a controller chip, wherein each controller chip has an encryption and decryption circuit module; and
   a host, operating the non-volatile memory via the controller chip; and
   an encryption and decryption key space storing a key for the encryption and decryption circuit module to perform data encryption and decryption, which is isolated from the data storage device and the host by default so that a user who does not pass identity authentication is unable to operate the encryption and decryption circuit module through the host to decrypt data of the non-volatile memory,
   wherein the key is generated by the host via an encryption and decryption application or is a user input prompted by the encryption and decryption application.

2. The data center as claimed in claim 1, wherein:
   the encryption and decryption key space is disconnected from the host after the key is stored in the encryption and decryption key space and, when the identity authentication succeeds, the encryption and decryption key space is reconnected to the host.

3. The data center as claimed in claim 2, wherein:
   the encryption and decryption circuit module is driven by the host through vendor unique commands.

4. The data center as claimed in claim 3, wherein:
   the host calls the vendor unique commands by executing the encryption and decryption application.

5. The data center as claimed in claim 4, wherein:
   when determining that user data is confidential data, the host calls the vendor unique commands via the encryption and decryption application to drive the encryption and decryption circuit module to use the key to encrypt and store the confidential data in the non-volatile memory; and
   a particular logical block address is allocated to manage the confidential data.

6. The data center as claimed in claim 5, wherein:
   after storing the key in the encryption and decryption key space, the host removes the key from the host and the data storage device via the encryption and decryption application.

7. The data center as claimed in claim 6, wherein:
   when receiving a read request for reading the particular logical block address, the host calls for the identity authentication via the encryption and decryption application.

8. The data center as claimed in claim 7, wherein:
   when the identity authentication succeeds and the encryption and decryption key space is reconnected to the host, the host calls the vendor unique commands via the encryption and decryption application to drive the encryption and decryption circuit module to use the key to decrypt the data of the non-volatile memory to respond to the read request.

9. The data center as claimed in claim 8, wherein:
   after the encryption and decryption circuit module finishes data decryption, the host removes the key from the host and the data storage device via the encryption and decryption application.

10. A method for operating a data center, comprising:
providing at least one data storage device in the data center, wherein each data storage device has a non-volatile memory and a controller chip, and each controller chip has an encryption and decryption circuit module;
using a host of the data center to operate the non-volatile memory via the controller chip;
providing an encryption and decryption key space storing a key for the encryption and decryption circuit module to perform data encryption and decryption; and
using the host to generate the key via an encryption and decryption application or executing the encryption and decryption application to prompt a user input as the key,
wherein the encryption and decryption key space is isolated from the data storage device and the host by default so that a user who does not pass identity authentication is unable to operate the encryption and decryption circuit module through the host to decrypt data of the non-volatile memory.

11. The method as claimed in claim 10, wherein:
the encryption and decryption key space is disconnected from the host after the key is stored in the encryption and decryption key space and, when the identity authentication succeeds, the encryption and decryption key space is reconnected to the host.

12. The method as claimed in claim 11, further comprising:
using the host to drive the encryption and decryption circuit module through vendor unique commands.

13. The method as claimed in claim 12, further comprising:
using the host to call the vendor unique commands by executing the encryption and decryption application.

14. The method as claimed in claim 13, further comprising:
when the host determines that user data is confidential data, using the host to call the vendor unique commands via the encryption and decryption application to drive the encryption and decryption circuit module to use the key to encrypt and store the confidential data in the non-volatile memory; and
allocating a particular logical block address to manage the confidential data.

15. The method as claimed in claim 14, further comprising:
after storing the key in the encryption and decryption key space, using the host to remove the key from the host and the data storage device via the encryption and decryption application.

16. The method as claimed in claim 15, further comprising:
when receiving a read request for reading the particular logical block address, using the host to call for the identity authentication via the encryption and decryption application.

17. The method as claimed in claim 16, further comprising:
when the identity authentication succeeds and the encryption and decryption key space is reconnected to the host, using the host to call the vendor unique commands via the encryption and decryption application to drive the encryption and decryption circuit module to use the key to decrypt the data of the non-volatile memory to respond to the read request.

18. The method as claimed in claim 17, further comprising:
after the encryption and decryption circuit module finishes data decryption, using the host to remove the key from the host and the data storage device via the encryption and decryption application.

* * * * *